United States Patent
Valk et al.

(12)

(10) Patent No.: US 9,962,614 B1
(45) Date of Patent: May 8, 2018

(54) VALIDATING TOY GENUINENESS

(71) Applicant: Activision Publishing, Inc., Santa Monica, CA (US)

(72) Inventors: Kevin Robert Valk, Nijmegen (NL); Robert Leyland, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 9 days.

(21) Appl. No.: 15/184,760

(22) Filed: Jun. 16, 2016

(51) Int. Cl.
*A63F 13/69* (2014.01)
*A63F 13/73* (2014.01)
*A63F 13/24* (2014.01)
*A63F 13/23* (2014.01)
*A63F 13/95* (2014.01)

(52) U.S. Cl.
CPC .............. *A63F 13/73* (2014.09); *A63F 13/23* (2014.09); *A63F 13/24* (2014.09); *A63F 13/69* (2014.09); *A63F 13/95* (2014.09)

(58) Field of Classification Search
None
See application file for complete search history.

(56) References Cited

U.S. PATENT DOCUMENTS

| | | | |
|---|---|---|---|
| 2004/0009815 A1* | 1/2004 | Zotto | G06F 21/10 463/42 |
| 2015/0087427 A1* | 3/2015 | Wane | A63F 13/213 463/43 |
| 2015/0318894 A1* | 11/2015 | Shimohata | G06F 21/62 455/41.1 |

* cited by examiner

*Primary Examiner* — Damon Pierce
(74) *Attorney, Agent, or Firm* — Klein, O'Neill & Singh, LLP

(57) ABSTRACT

A toy for use with respect to videogame play may include information of a game character and/or game object, with the toy including a digital signature which a game device may check to determine that the toy is a genuine toy. In various embodiments security keys may be required to read information of the toy, and the security keys may be generated by a peripheral device of a videogame system. In some embodiments some of the information may be stored on the toy in encrypted form.

17 Claims, 8 Drawing Sheets

| Block | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Sector 0 (311a) | | | | | | | | | | | | | | | | |
| 0 | Non-UID | | | | LRC | | SAK | | ATQA | | Manufacturer data | | | | | |
| 1 | ToyType | | | | TradingCardId | | | | | | | | SubType | | Checksum | |
| 2 | | | | | | | | | | | | | | | | |
| 3 | | | | | Key A | | | | ACL | | | | | | | |
| Sector 1 (311b) | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | Key A | | | | ACL | | | | | | | |
| ... | | | | | ... | | | | | | | | | | | |
| Sector 15 (311p) | | | | | | | | | | | | | | | | |
| 60 | | | | | | | | | | | | | | | | |
| 61 | | | | | | | | | | | | | | | | |
| 62 | | | | | | | | | | | | | | | | |
| 63 | | | | | Key A | | | | ACL | | | | SIGNATURE | | | |

FIG. 3B

VALIDATING TOY GENUINENESS

BACKGROUND OF THE INVENTION

The present invention relates generally to computer security, and more particularly to validation of toys used with videogames.

Videogames provide fun and enjoyment for many. Videogames allow game players to participate in a variety of simulated activities. Videogames allow game players to perform roles and experience activities that the game players may not be able or desire to experience directly, whether due to cost, danger, or equipment concerns, or simply due to a role or activity being a fantasy.

Some videogames make use of adjunct physical toys. The physical toys may include information regarding game items or objects, or, more usually, game characters which a game player may control during gameplay. The information may be in the form of computer readable information, with the information stored in a memory device of the toy. A game system may read the information, and use the information during gameplay.

Unfortunately, the information in the toy may not be secure. Moreover, the game system may not have the capability to detect whether the information in the toy has been tampered with, or even if the information read is actually from an authorized toy meant for the videogame.

BRIEF SUMMARY OF THE INVENTION

Some aspects of the invention provide an embodiment of a method for utilizing information of a toy in a videogame, comprising: determining, by a peripheral device, at least one security key for reading at least some information from the toy; providing, by the peripheral device, at least one read request to the toy, the read request including the at least one security key; receiving, by the peripheral device, information from the toy, the information from the toy responsive to the at least one read request, the information from the toy including a digital signature and other information; providing the information from the toy to a game device; determining, by the game device, a public key for use in validating the digital signature included in the information from the toy; determining, by the game device, whether the digital signature is valid; and utilizing the other information for use in play of the videogame if, and only if, the digital signature is valid.

Some aspects of the invention provide an embodiment of a videogame system, comprising: a game device including a processor, the processor configured to request that information be read from a memory of a toy, and process responsive information from the toy, the responsive information including a digital signature and other information, and check the digital signature for validity, and utilize at least some of the other information in providing for game play of a videogame; and a peripheral device including a controller, the controller configured to generate at least one security key for use in reading information from the toy, to provide the toy a read request for the information, and to provide the responsive information from the toy to the game device.

These and other aspects of the invention are more fully comprehended upon review of this disclosure.

BRIEF DESCRIPTION OF THE FIGURES

FIG. 3B shows a further example data structure for memory of a toy.

DETAILED DESCRIPTION

Some embodiments in accordance with aspects of the invention distribute security functions for a toy amongst a plurality of hardware items. In some embodiments all of a toy, a peripheral device, and a game device of a video game system include security functions. In some embodiments the peripheral device generates one or more security keys required for reading of information of a toy, the toy includes a digital signature, generated using a key (which may be a private key, or a combination of a private key and a public key), for validating information of the toy, and the game device includes digital signature validation capability (which may include use of a public key) and private key decryption capability for decrypting encrypted information of the toy.

In some embodiments in accordance with aspects of the invention, a game device requests that information be obtained from memory of a toy, a peripheral device determines a security key necessary for reading the information from the toy and provides the toy with a request for the information along with the security key, the toy passes the information and a digital signature to the peripheral device, which in turn passes the information and the digital signature to the game device, and the game device checks the digital signature for validity and, if valid, decrypts the information from the toy.

In some embodiments the digital signature is generated using a private key and validated using a public key. In some embodiments the game device selects the public keys from a table of public keys, based on an item of information from the toy. In some embodiments the digital signature comprises or is also based on other information stored on the toy.

Figure 1:
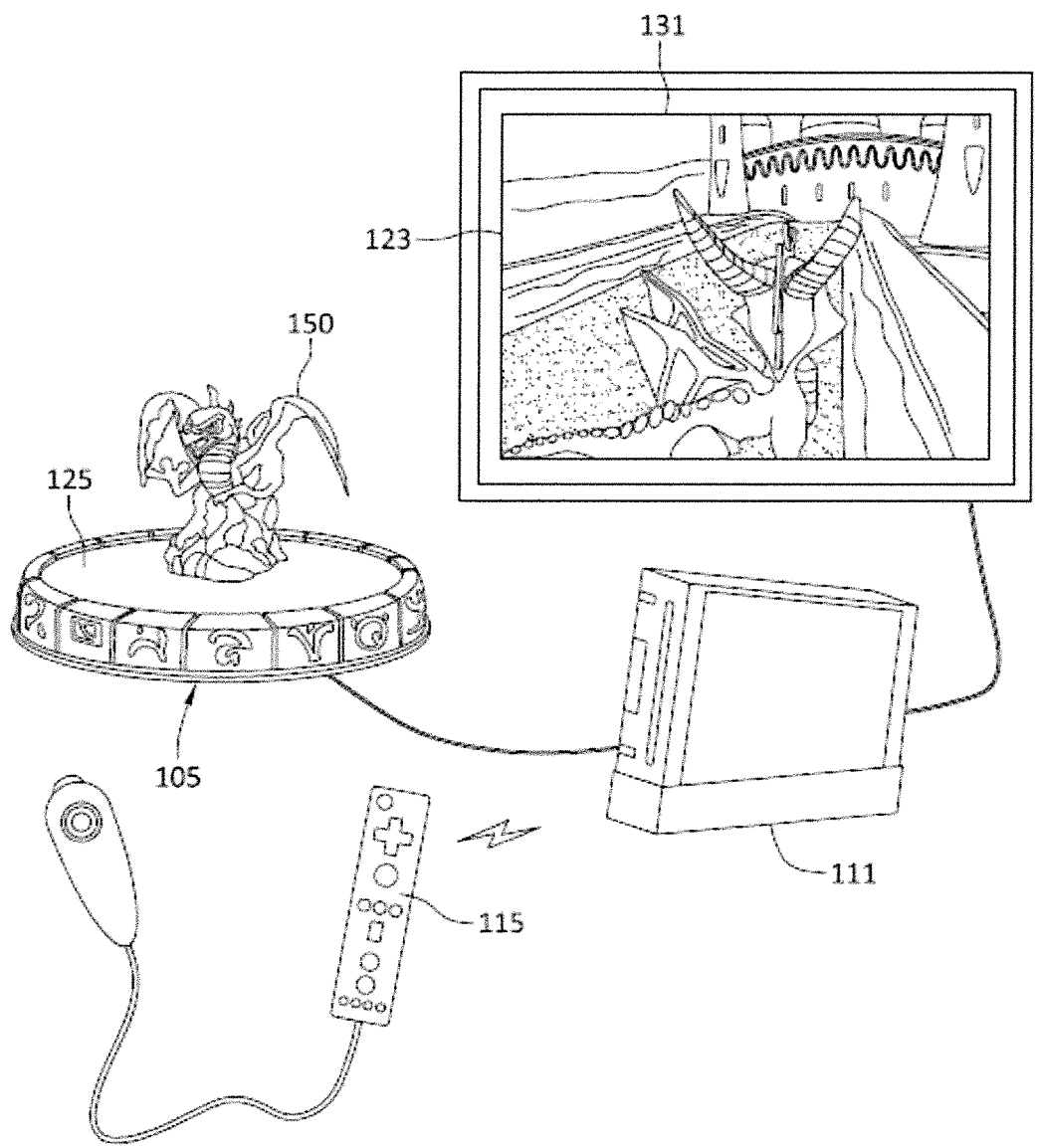
FIG. 1 illustrates an example of a video game system in accordance with aspects of the invention.

FIG. 1 illustrates an example of a video game system in accordance with aspects of the invention. The video game system includes a game console 111 with a processor for executing program instructions providing for game play and associated circuitry, user input devices such as a game controller 115, a display device 123 for displaying game action, a peripheral device 105, and a toy 150, which in various embodiments includes a rewritable memory. The game console may be considered a game device in the context of FIG. 1. In some embodiments the game console, user input devices, and display device may be incorporated in a common housing, and together may be considered a game device. The peripheral device 105 may also provide the toy 150 with electrical power, for example through inductive couplings, although in some embodiments, the toy 150 may have its own source of electrical power, for example, a battery.

The processor, in accordance with instructions providing for gameplay and responsive to inputs from the user input devices and the peripheral device 105, generally commands display on the display device 123 of game characters in and interacting with a virtual world of game play and possibly each other. For example, the processor, responsive to inputs from the peripheral device 105, for example inputs based on information read from the toy, may add or remove characters and objects to or from the virtual world, and the processor may control actions and activities of game characters based on inputs from the user input devices.

The toy 150 includes machine-readable information, and in some embodiments writeable information, for example, of a memory or a radio frequency identification (RFID) tag. The machine-readable/writable information may be sensed, read, and/or written by the peripheral device 105, and/or in some embodiments by the gaming device, directly or indirectly to the toy memory and/or tag. The machine-readable/writable information may include an identifier uniquely identifying the toy, and information regarding a character for the video game, or in various embodiments other video game objects, such as accessories or weapons. In various embodiments, the information regarding the character or other object may include characteristics, powers, and/or attributes of the character or other object, and/or information relating to game play achievements or events.

In various embodiments reading and/or writing of the information of the toy, or at least some of it, requires use of one or more security keys. In such embodiments the toy includes circuitry that restricts access to memory storing the information unless the security key for the memory, or portion of memory, is also provided. In some embodiments the security keys may be stored in memory of the toy, although in some embodiments the security keys may be effectively stored in the toy by or in conjunction with the use of electronic circuitry.

Further, in various embodiments the information of the toy, or at least some of it, may be encrypted, for example using a symmetrical key in some embodiments or using a public key, which requires use of a private key for decryption, in some embodiments. In addition, in some embodiments the toy may also store a digital signature, which may be generated, for example using a private key, and, in various embodiments, other information of or based on information of the toy (for example a digest of information of the toy).

The peripheral device 105, in some embodiments and as shown in FIG. 1, has a substantially flat upper surface 125 for placement of one or more toys thereon. The game player generally places game toys, for example, toy 150 as shown in FIG. 1, on the flat surface 125 of the peripheral device during game play. The peripheral device 105 provides the capability to read information from the toy 150, and in some embodiments to write information to the toy as well.

In some embodiments the peripheral device includes circuitry for generating the security keys for use in reading and/or writing of the information of the toy. In some such embodiments, some information of the toy may be read without need for use of a security key, and in such embodiments the circuitry of the peripheral device may use such information to generate the security keys. In some embodiments the peripheral device may include memory for storing the security keys.

In some embodiments the peripheral device reads the digital signature from the toy and provides the digital signature to the game console. In some such embodiments the processor of the game console validates or verifies the digital signature prior to making use of at least some other information of the toy provided by the peripheral device. In some embodiments the processor also decrypts information of the toy, other than the digital signature. In some such embodiments the processor does not decrypt such information of the toy unless the processor has verified the digital signature.

In some embodiments, when a toy memory or tag is read by the peripheral device 105, the peripheral device 105 provides the game console an indication of the identifier and status information of the toy, and generally the processor of the game console commands display of a corresponding game character or video game object, or otherwise makes the corresponding game character or video game object available in game play. In other embodiments, game-related information stored on the toy may be read and used by the processor to conduct a game play sequence.

The instructions providing for game play are generally stored on removable media, for example, an optical disk. Accordingly, the game console may include an optical drive, for example, a DVD-ROM, CD-ROM or Blu-ray drive, for reading the instructions for game play. In some embodiments, the removable media may be a flash memory data storage device. In some embodiments, the game console may be a personal computer, including similar internal circuitry as herein described, as well as, for example, a built-in display and built-in user input devices, such as a keyboard and a touch pad or mouse. In other embodiments, the instructions providing for game play may be stored in a remote server that is accessed by a computer or mobile device. In yet other embodiments, the instructions providing for game play may be stored on the local memory of the game console.

The display device 123 is generally coupled to the gaming platform by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. A display screen 131 of the display device 123 displays video images of game play, generally as commanded by the processor or other associated circuitry of the gaming platform. In the embodiment of FIG. 1, the display screen shows a screen shot of video game play. As illustrated, the screen shot shows a display of a character, generally controlled by and animated in accordance with user inputs, approaching an inanimate item in the form of what may be considered a castle.

Figure 2:
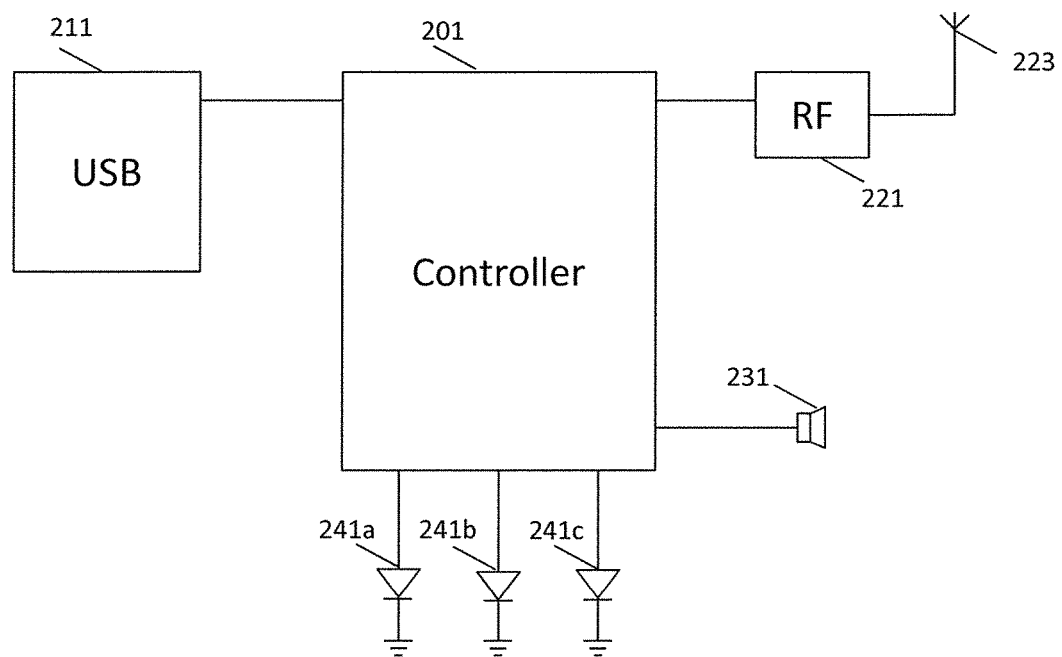
FIG. 2 is a block diagram of a video game peripheral in accordance with aspects of the invention.

FIG. 2 is a block diagram of a video game peripheral in accordance with aspects of the invention. In some embodiments the video game peripheral is the peripheral device of FIG. 1. The peripheral device may be used in some embodiments to detect toys placed thereon. The peripheral device may be used to provide information from the toy to a game console and, in some embodiments, from the game console to the toy or from one toy to another toy. Accordingly, the peripheral device includes a universal serial bus (USB) interface 211 to communicate with the game console. In some embodiments, the peripheral device may use a different interface, for example, a wireless interface for communication with the game console. The information communicated between the peripheral device and the game console may be encrypted, and the information read from or written to the toy by the peripheral may also be encrypted.

The peripheral device also includes a radio-frequency (RF) interface 221 to communicate with toys. In many embodiments, the radio-frequency interface is a radio frequency identification (RFID) interface. In other embodiments, the peripheral device may include a different interface for communicating with toys, such as an optical interface or a wired interface.

The peripheral device includes a controller 201 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toys are present on the peripheral device or to read from or write to a particular toy. In other embodiments, the controller may independently communicate with the radio-frequency interface and supply resulting information to a game console over the USB interface. For example, the controller may, via the radio-frequency interface, regularly detect what toys are newly present on the peripheral and report the detected toys to the game console via the USB interface. The controller generally includes a programmable device such as a microprocessor performing program instructions. The program instructions may be stored in the peripheral as firmware or downloaded from the game console.

In various embodiments the controller of the peripheral device is configured to generate security keys for use in communicating with a toy. In some embodiments the toy may have various portions of memory protected by security keys, with provision of the security keys required to read from and/or write to those portions of the memory. In some embodiments the controller is configured to generate the security keys based on information identifying the toy. In some embodiments the controller may have the security keys stored in memory of the controller, or be configured to generate the security keys based on information stored in memory of the controller.

The peripheral device also includes, in some embodiments, a loudspeaker 231. The loudspeaker provides audio signaling to game players and the signaling may relate to a particular toy present on the peripheral device. In some embodiments, the peripheral device includes visual indicators such as light-emitting diodes 241*a-c*. The diodes may, for example, be illuminated with intensities or colors according to characteristics of the toy or to signal performance in the video game of characters associated with toys on the peripheral. Both the loudspeaker and visual indicators are coupled to the controller. The controller signals the loudspeaker and visual indicators to operate according to commands received via the USB interface.

Figure 3A:
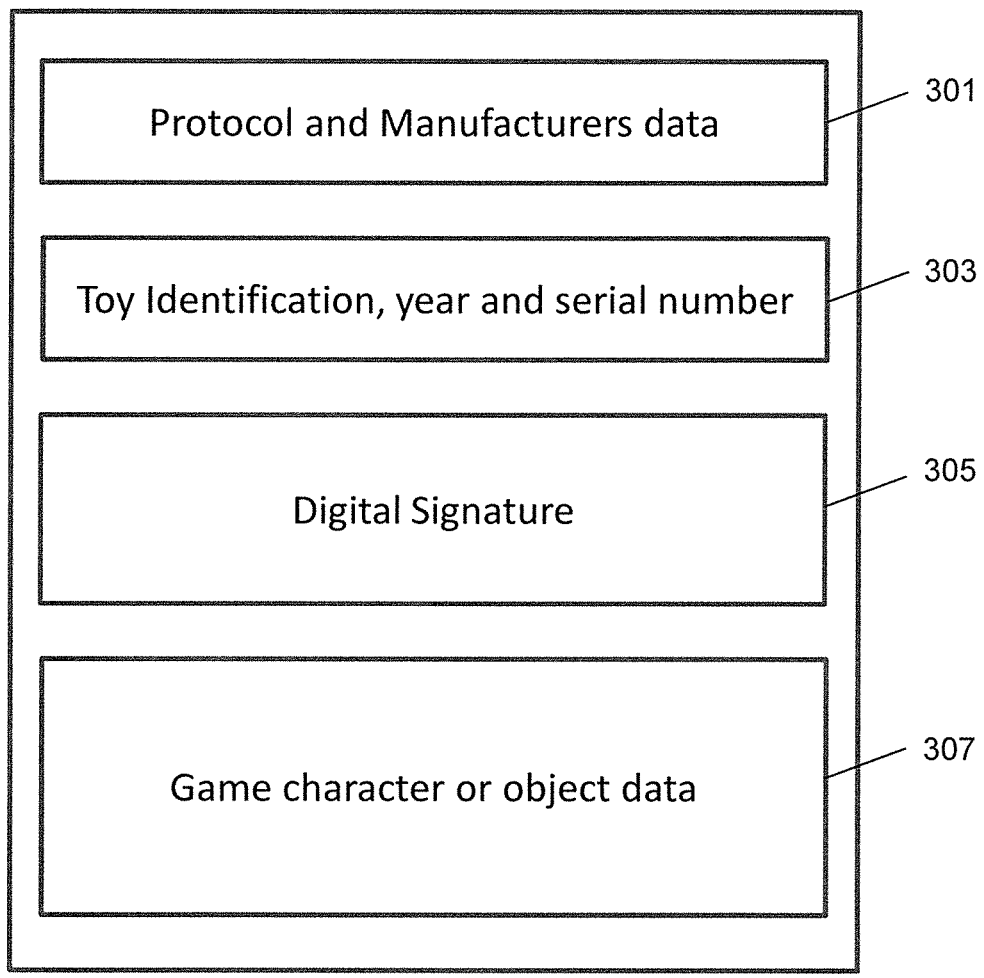
FIG. 3A shows an example data structure for memory of a toy.

FIG. 3A shows an example data structure for memory of a toy. In some embodiments the toy may be the toy discussed with respect to FIG. 1. In some embodiments, however, the data structure for memory of the toy may be another memory structure.

The data structure of FIG. 3A includes a first field 301 for protocol and manufacturer data, a second field 303 for toy identification (which may identify a toy type and/or toy subtype), year of manufacture (which may be a nominal year), and a toy serial number, a third field 305 for a digital signature, and a fourth field 307 for game character or object data. In various embodiments the fields may not be equally sized, with for example different ones of the fields able to store different quantities of bytes of data, and in various embodiments the fields may be differently arranged, and may be non-contiguously arranged.

In some embodiments data in the first field is written to memory as part of a manufacturing process of the memory, and may not be changed thereafter. In some embodiments data in the second field is also written to memory as part of the manufacturing process of the memory, or as part of a manufacturing process of a toy including the memory, and in some embodiments the data in the second field also may not be changed thereafter. In some embodiments data in the second field may be encrypted, with in some embodiments the encryption being performed using a symmetric key and in some embodiments being performed using a public key.

In some embodiments data in the third field comprises, and consists of in some embodiments, the digital signature. In some embodiments the digital signature is generated using a private key. In some embodiments the digital signature is also generated using information of, or information based on, information of one or more other fields. In some embodiments the digital signature is also generated using information based on in at least some of the information in the first two fields, with in some embodiments a hash function applied to such information to create a digest.

In various embodiments data in the fourth field comprises information relating to a game character or object. In some embodiments data in the fourth field, which is generally both readable and writable, is stored in encrypted form.

In some embodiments some or all of the fields may include one or more security keys, with access to data in those fields restricted unless the appropriate security is included with an access command, for example a read or write command.

FIG. 3B shows a further example data structure for memory of a toy. In some embodiments the toy may be the toy discussed with respect to FIG. 1. In some embodiments, however, the data structure for memory of the toy may be another memory structure.

The data structure of FIG. 3 includes a total of 1024 bytes of storage, arranged in 16 sectors 311*a-p*. In FIG. 3 the sectors are labeled from a Sector 0 to a Sector 15. Each sector includes 4 blocks of 16 bytes each. In FIG. 3, the blocks are labeled sequentially, starting from a Block 0 in Sector 0 to a Block 63 in Sector 15. In various embodiments the blocks may be of greater or lesser size, there may be more or fewer blocks, and/or there may be more or fewer sectors, which may include more or fewer blocks.

Block 0 includes information useful for use in communicating with the toy, for example using MIFARE® (MIFARE is a registered trademark of NXP B.V.) protocols. The information in block 0, for example, may include information uniquely identifying a toy, and other information. In some embodiments the information uniquely identify the toy comprises a toy identifier, although in some embodiments such information may be in another block, for example block 1. In some embodiments the other information includes a year of manufacture of the toy. In some embodiments the year of manufacture is a calendar year, but in various embodiments the year of manufacture may be a model year, and in some embodiments the year of manufacture may be a nominal year, and the nominal year (or model year) may encompass only a portion of a single calendar year or span multiple calendar years or portions thereof. In some embodiments information of block 0 is set at time of manufacture, and may not be changed thereafter.

In some embodiments the information of block 0 is unencrypted, even if other or all other information in the data structure is encrypted. In many embodiments the information in block 0 may not be modified.

Block 1 includes information identifying a type for the toy, a subtype for the toy, and other information. Parts of block 3, and every fourth block thereafter, include a security key and an ACL. As every sector includes four blocks, every sector therefore includes a security key and an ACL. In many embodiments the security key must be provided in order to read from or write data to blocks of that sector. The remaining blocks may include various items of information, generally relating to a virtual character or object represented by the toy. In some embodiments all of the blocks of the toy, other than blocks of sector 0 (and in some embodiments sector 1), are encrypted.

In some embodiments one block of the remaining blocks, or in some embodiments a plurality of blocks of the remaining blocks, includes a digital signature. In some embodiments, each sector includes portions of or all of a digital signature. In some embodiments a plurality of sectors, which may be fewer than all sectors, may include portions or all of a digital signature. In some embodiments, and as illustrated in exemplary form in FIG. 3B, portions of a digital signature may be located in bytes of a last block of a sector, or a plurality of sectors. In some embodiments the digital signature may be located in bytes of a plurality of blocks, each located in different sectors. In some embodiments the digital signature has been generated using asymmetrical or symmetrical cryptography. In some embodiments the digital signature has been generated using a private key. In some embodiments the digital signature is also based on information of selected blocks of memory of the toy. In some such embodiments, the information of those blocks may also be encrypted, either before or after use in the digital signature, depending on the embodiment.

Figure 4:
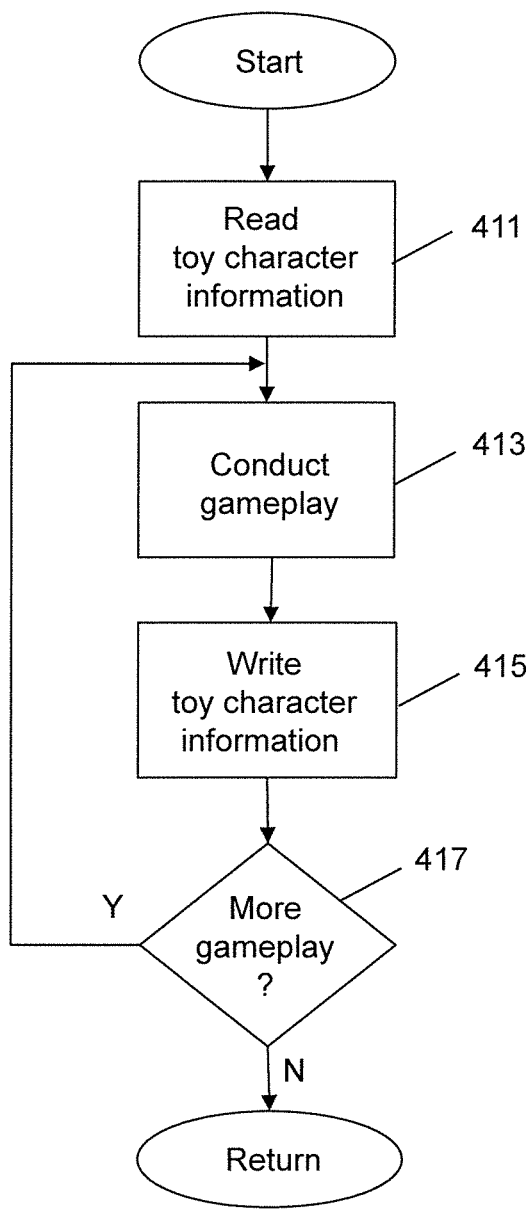
FIG. 4 is a flow diagram of a process using a toy in videogame play in accordance with aspects of the invention.

FIG. 4 is a flow diagram of a process using a toy in videogame play in accordance with aspects of the invention. In some embodiments the process is performed by a video game system. In some embodiments the video game system is the video game system of FIG. 1. In some embodiments a toy of the video game system includes memory including information organized as discussed with respect to FIG. 3A or 3B.

In block 411 the process reads toy character information. In some embodiments the toy character information is read from memory of a toy. In some embodiments the information is read by a peripheral device, with in some embodiments the peripheral device reading the information as requested by a game device. In some embodiments presence of the toy about the peripheral device is sensed as discussed in U.S. patent application Ser. No. 13/109,956, entitled VIDEO GAME WITH CONCURRENT PROCESSING OF GAME-RELATED PHYSICAL OBJECTS, filed May 17, 2011, and published on Nov. 22, 2012 as U.S. Patent Application Publication No. US 2012/0295703, the disclosure of which is incorporated by reference herein for all purposes. As part of sensing the toy, generally the toy provides a toy identifier to the peripheral device.

In some embodiments the peripheral device includes circuitry to generate one or more security keys for reading and/or writing information to the toy based on the toy identifier. In some embodiments the peripheral toy additionally uses an indicator of a sector from which information will be read in generating security keys. In some embodiments the peripheral device includes memory storing the security keys, or information from which circuitry of the peripheral device may generate the security keys.

In some embodiments the peripheral device provides a read command to the toy, along with a security key. In some embodiments the read command is for information requested by the game device. In some embodiments the peripheral device provides a plurality of read commands, which may be read commands for a single sector or, more commonly, for a plurality of sectors. In general the peripheral device may provide a sufficient number of read commands, along with appropriate security keys, to obtain information stored by the toy for a game character or game object.

The game device receives the read information from the peripheral device. In some embodiments the read information includes a digital signature. In some such embodiments the game device validates the digital signature using a public key. In some embodiments the game device stores the public key in memory. In some embodiments the game device stores a plurality of public keys in memory, with the game device selecting one of the public keys for use based on some of the read information, for example using information stored in one or more fields or blocks of the toy. In some embodiments the game device validates the digital signature using information stored in memory of the game device. In some embodiments the game device validates the digital signature using information of or based on some of the read information.

In some embodiments the game device does not utilize some of the read information, except as used in validating the digital signature, if the digital signature is not valid. In some embodiments the game device does not add a game character or game object to which the read information pertains to videogame play if the digital signature is not valid.

In some embodiments the other read information, or at least some of it, is also encrypted. In such embodiments the game device decrypts the other information.

In block 413 the process conducts gameplay. In some embodiments the process conducts gameplay by adding a game character or game object to gameplay, with the game character or game object corresponding to the information of the toy. Generally, during gameplay, the game device executes program instructions to allow a user to use user input devices to control a game character in a virtual world of game play, with the game character in and interacting with a virtual world and its inhabitants, with the game device also executing program instructions providing for display of the character and the virtual world of gameplay on a display device.

In block 415 the process writes toy character information to memory of the toy. In various embodiments the game character or object corresponding to the toy may have characteristics, capabilities, or achievements that change as a result of gameplay, with the characteristics, capabilities, or achievements being information about the game character or game object that is also stored on the toy. For example, the game character may obtain experience, have health changes, obtain new items, or reach a higher (or lower) game achievement level. Accordingly, in various embodiments the game device commands the peripheral device to write the changed information to the memory of the toy. In some embodiments the game device also encrypts the changed information, for example for embodiments in which such information is stored in encrypted form in the toy.

The peripheral device commands the toy to store the changed information. In doing so, the peripheral device also generates appropriate security keys for providing the toy along with the commands to store the changed information.

In some embodiments the peripheral device generates the security keys in the same manner as discussed with respect to block 411.

In block 417 the process determines if gameplay is to continue. If so, the process goes to block 413 and conducts further gameplay, although in some embodiments or instances the process may go to block 411 and read information from additional or other toys. Otherwise the process returns.

Figure 5:
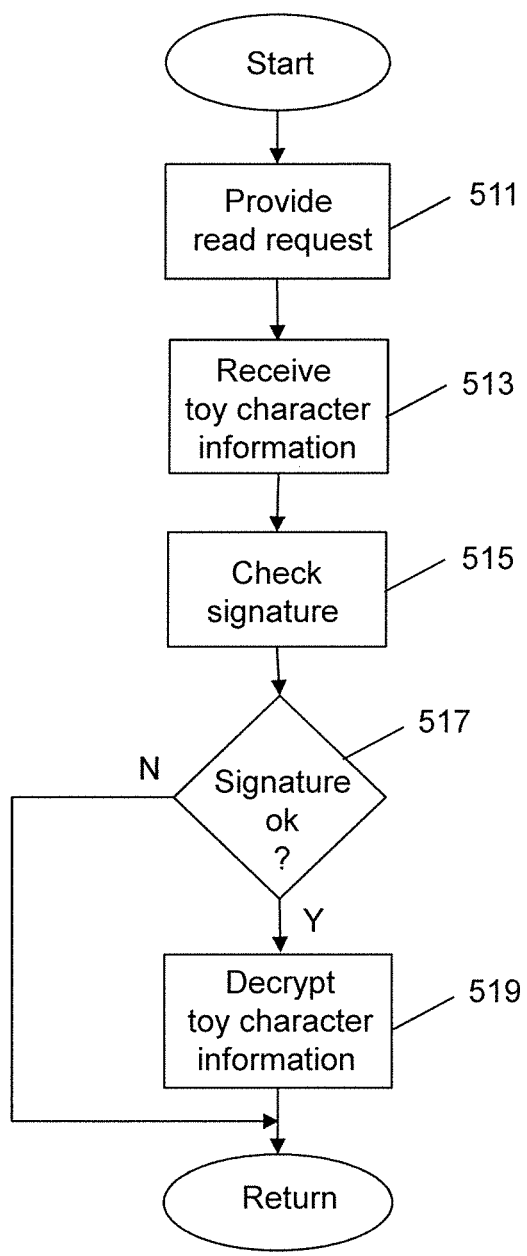
FIG. 5 is a flow diagram of a process of useful in obtaining character or object information from a toy in accordance with aspects of the invention.

FIG. 5 is a flow diagram of a process of useful in obtaining character or object information from a toy in accordance with aspects of the invention. In some embodiments the process is performed by a video game system. In some embodiments the video game system is the video game system of FIG. 1. In some embodiments the process is perforated by a game device, which may be a game device of a video game system. In some embodiments the process is performed by a processor of the game device, with the processor for example performing the process in accordance with program instructions. In some embodiments the process is performed by a game device, with the game device in communication with a peripheral device, which in turn is in communication with a toy having a memory storing information regarding a game character or game object. In some embodiments a toy of the video game system includes memory including information organized as discussed with respect to FIG. 3. In some embodiments the process of FIG. 5 performs some of the operations of block 411 of the process of FIG. 4, and in some embodiments the process of FIG. 5 performs operations of block 411 of the process of FIG. 4 that are performed by the game device.

In block 511 the process provides a read request. In some embodiments the read request is a request to obtain information regarding a game character or game object from a memory of a toy. In some embodiments the read request is provided to a peripheral device. In some embodiments the read request is for information for an identified toy, and in some embodiments the identified toy is identified by way of a unique identifier stored in memory of the toy and previously provided to the game device by the peripheral device. In some embodiments the read request identifies locations in memory of the toy, for example by sector and/or block and/or byte.

In block 513 the process receives information from the toy. In some embodiments the information is provided to the game device by the peripheral device, which received the information from the toy. In some embodiments the information of the toy comprises a digital signature. In some embodiments the information of the toy comprises a digital signature and additional information regarding a game character and/or game object, which the toy represents.

In some embodiments the information regarding the game character includes information regarding game character characteristics, status, capabilities, and/or achievements. In some embodiments the information is regarding a game object. In some embodiments the information regarding the game object is information regarding characteristics and/or capabilities of the game object. In some embodiments the information regarding the game character and/or game object comprises a toy type, a toy subtype, and/or other information. In some embodiments the information from the toy includes information of pre-identified blocks of the toy and the digital signature. In some embodiments the received information from the toy is responsive to multiple read requests.

In block 515 the process checks the digital signature received from the toy. In some such embodiments the game device determines if the digital signature is valid using a public key. In some embodiments the public key is some of the information received from the toy. In some embodiments the game device has the public key stored in memory. In some embodiments the game device stores a plurality of public keys in memory, with the game device selecting one of the public keys for use based on information read from the toy. In some embodiments the game device selects the public key from a table using information stored in the toy regarding a year of manufacture of the toy, which may be a nominal year. In some embodiments the game device uses information stored in memory of the game device in determining if the digital signature is valid. In some embodiments the game device uses other of the information from the toy, or a digest of other of the information from the toy, in determining if the digital signature is valid. In some embodiments the other information from the toy comprises pre-identified fields of memory of the toy. In some embodiments the pre-identified fields are fields storing protocol and manufacturer data and toy identification, year of manufacture, and serial number data. In some embodiments the other information from the toy comprises information from pre-identified blocks of memory of the toy. In some embodiments the pre-identified blocks of memory of the toy include block 0, in some embodiments the pre-identified blocks include block 1, and in some embodiments the pre-identified blocks include block 0 and block 1.

In block 517 the block determines if the digital signature is valid. In most embodiments the digital signature is considered valid if the decrypted digital signature matches the comparison value. If the digital signature is valid, the process proceeds to block 519, otherwise the process returns.

In block 519 the process decrypts information from the toy regarding the game character and/or game object, if the information is encrypted, so that the game device may use the information in providing gameplay. Block 519 may be bypassed if the information from the toy regarding the game character and/or game object is not encrypted.

The process thereafter returns.

Figure 6:
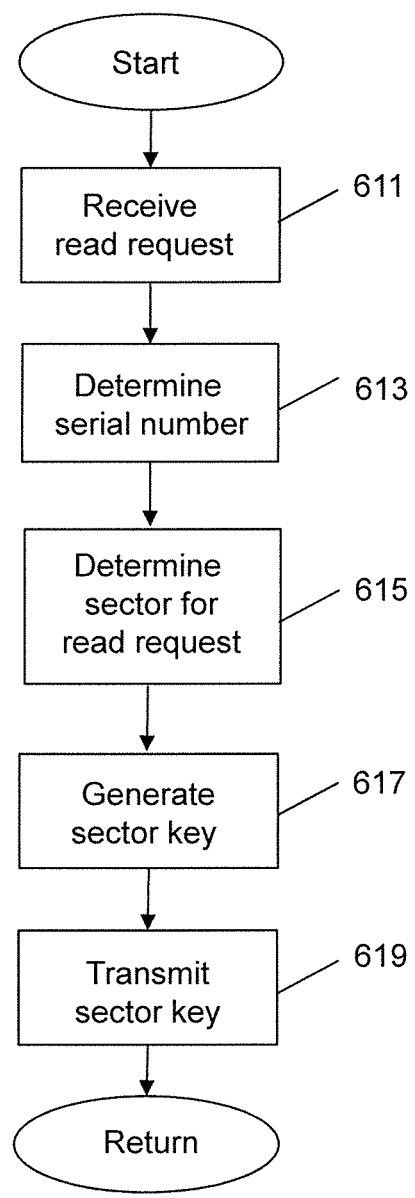
FIG. 6 is a flow diagram of a process of useful in obtaining character or object information from a toy in accordance with aspects of the invention.

FIG. 6 is a flow diagram of a process of useful in obtaining character or object information from a toy in accordance with aspects of the invention. In some embodiments the process is performed by a video game system. In some embodiments the video game system is the video game system of FIG. 1. In some embodiments the process is performed by a peripheral device, which may be a peripheral device of a video game system. In some embodiments the process is performed by a processor and/or other circuitry of the peripheral device, with the processor for example performing the process in accordance with program instructions. In some embodiments the toy includes memory including information organized as discussed with respect to FIG. 3A or 3B. In some embodiments the process of FIG. 6 performs some or all of the operations of block 411 of the process of FIG. 4 that are performed by the peripheral device.

In block 611 the process receives a read request, for example from a game device. In some embodiments the read request is for information from the toy. In some embodiments the toy representative of a game character or a game object. In some embodiments the read request is for particular information from the toy. In some embodiments the read request is for information from particular sectors and/or blocks of memory of the toy.

In block 613 the process determines an identifier for the toy. In some embodiments the identifier is a serial number for the toy, with the serial number uniquely identifying the toy. In some embodiments the toy previously transmitted the serial number to the peripheral device, and the serial number may be stored in memory of the peripheral device.

In block 615 the process determines a field (or portion thereof) or sector for the read request. In some embodiments the field or sector for the read request is provided as part of operations of block 611. In some embodiments the field or sector for the read request is determined based on other information. For example, in some embodiments the field or sector for the read request is based on a last read field or sector from the toy, with for example a to-be-read field or sector being determined by incrementing the field or sector number of the last read field or sector. Also for example, in some embodiments the field or sector for the read request is based on information of the read request, for example information identifying a type of information, for example information regarding health of the game character represented by the toy.

In block 617 the process generates a security key for the field or sector to be read. In some embodiments the peripheral devices stores security keys in a table in memory of the peripheral device, with a security key for each field (or portion thereof) or sector. In some embodiments the peripheral device includes circuitry, which may be a processor, for generating the security based on other information. For example, in some embodiments the peripheral device generates the security key based on an identifier for the toy, and in some embodiments the peripheral device generates the security key using the identifier for the toy and a field identifier or the sector number of the field or sector to be read.

In block 619 the process transmits the security key to the toy. In many embodiments the security key is transmitted to the toy along with other information of a read request, for example a field or sector number and/or block number of the information to be read.

The process thereafter returns.

Figure 7:
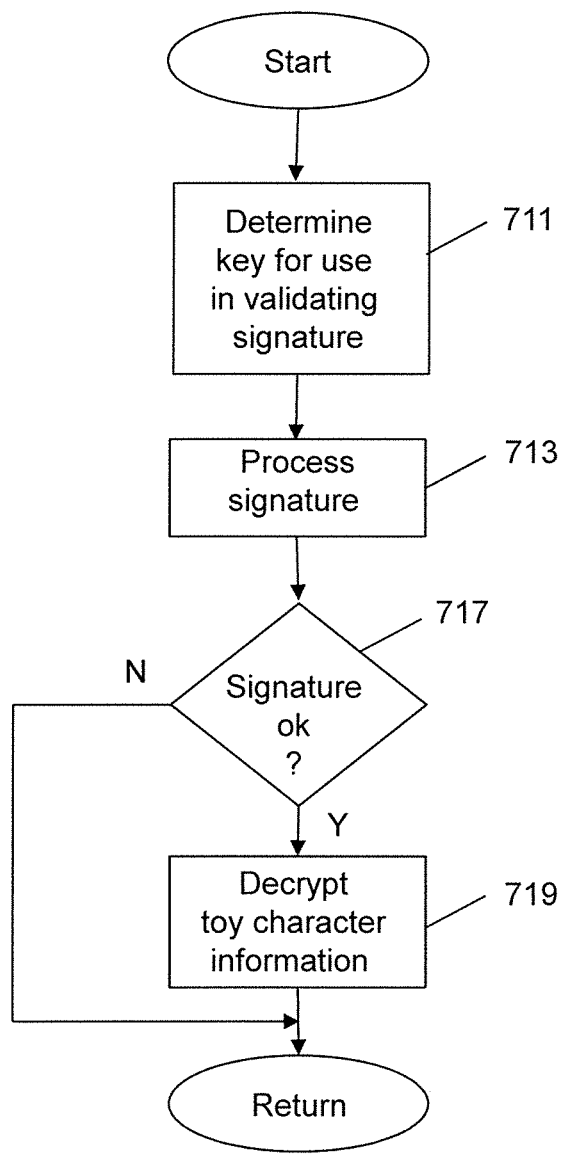
FIG. 7 is a flow diagram of a process of useful in obtaining character or object information from a toy in accordance with aspects of the invention.

FIG. 7 is a flow diagram of a process of useful in obtaining character or object information from a toy in accordance with aspects of the invention. In some embodiments the process is performed by a video game system. In some embodiments the video game system is the video game system of FIG. 1. In some embodiments the process is performed by a game device, which may be a game device of a video game system. In some embodiments the process is performed by a processor of the game device, with the processor for example performing the process in accordance with program instructions. In some embodiments the toy includes memory including information organized as discussed with respect to FIG. 3. In some embodiments the process of FIG. 7 performs some of the operations of block 515, 517, and 519 of the process of FIG. 5.

In block 711 the process determines a key for use in validating a digital signature from a toy. In some embodiments the key is a key stored in memory of the game device. In some embodiments the key is also from the toy. In some embodiments the key is determined based on other information of the toy. For example, in some embodiments the key is determined based on an identifier, or a portion of an identifier, of the toy. Also for example, in some embodiments the key is determined based on a toy type or other information of the toy. Also for example, in some embodiments the key is determined based on a year or nominal year of manufacture of the toy. In some such embodiments the game device may store a plurality of keys, or information from which the keys may be generated, with for example a separate key for each of a plurality of years of manufacture. In some embodiments, the toy type, other information of the toy, and/or the year of manufacture of the toy is stored on the toy in encrypted form, and the process additionally decrypts such information prior to using such information to determine the key for validating the digital signature.

In block 715 the process processes the digital signature to determine validity of the digital signature. In some embodiments the processing of the digital signature uses the key. In some embodiments the processing also uses other information read from the toy. In some embodiments, for example, the processing also uses data in pre-identified fields of memory of the toy. Also, for example, in some embodiments the processing uses information based on a plurality of blocks of information of the toy. In some embodiments the information is based on information of blocks 0 and 1 of the toy.

In block 717 the process determines if the digital signature is valid. In some embodiments the operations of block 717 perform the operations of block 517 of the process of FIG. 5. If the digital signature is valid, the process continues to block 719, otherwise the process returns.

In block 719 the process decrypts encrypted information from the toy, for example for use in gameplay. In some embodiments the operations of block 719 perform the operations of block 519 of the process of FIG. 5.

The process thereafter returns.

Although the invention has been discussed with respect to various embodiments, it should be recognized that the invention comprises the novel and non-obvious claims supported by this disclosure.

What is claimed is:

1. A method for utilizing information of a toy in a videogame, comprising:
   determining, by a peripheral device, at least one security key for reading at least some information from the toy;
   providing, by the peripheral device, at least one read request to the toy, the read request including the at least one security key;
   receiving, by the peripheral device, information from the toy, the information from the toy responsive to the at least one read request, the information from the toy including a digital signature and other information;
   providing, by the peripheral device, the information from the toy to a game device;
   determining, by the game device, a public key for use in validating the digital signature included in the information from the toy using at least some of the other information received from the toy;
   determining, by the game device, whether the digital signature is valid using the public key;
   utilizing the other information for use in play of the videogame if, and only if, the digital signature is valid.

2. The method of claim 1, wherein at least some of the other information received from the toy is encrypted, and the method further comprising decrypting the other information using a private key.

3. The method of claim 2, wherein determining whether the digital signature is valid using the public key further includes using the at least some of the decrypted other information.

4. The method of claim 1, wherein at least some of the other information received from the toy comprises information regarding a game character for the videogame.

5. The method of claim 4, wherein the information regarding the game character for the videogame comprises information regarding the identity and characteristics of the game character.

6. The method of claim 1 wherein the device stores a plurality of public keys and the determining of the public key for use in validating the digital signature includes selecting one of the plurality of public keys using at least some of the other information received from the toy.

7. The method of claim of claim 1 wherein the other information received from the toy includes at least one of a portion of an identifier of the toy, a year of manufacture of the toy, a nominal year of manufacture of the toy, a protocol of the toy, manufactured data, serial number data.

8. The method of claim 1 wherein a portion of the digital signature is stored in a particular block in each one of a set of sectors of a plurality of sectors of memory in the toy.

9. The method of claim 1 wherein the digital signature is generated using one of asymmetrical and symmetrical cryptography.

10. A videogame system, comprising:
a game device including a processor, the processor configured to request that information be read from a memory of a toy, and process responsive information received from the toy, the responsive information including a digital signature and other information, determine a public key to use to check the validity of the digital signature using the other information from the responsive information and check the digital signature for validity using the public key, and utilize at least some of the other information in providing for game play of a videogame in response to a determination that digital signature is valid; and
a peripheral device including a controller, the controller configured to generate at least one security key for use in reading information from the toy, to provide the toy a read request for the information to the toy, receive the responsive information from the toy, and to provide the responsive information from the toy to the game device.

11. The videogame system of claim 10, wherein the processor additionally uses information derived from the other information in the responsive information to check the digital signature for validity.

12. The videogame system of claim 10, wherein at least some of the other information in the responsive information is encrypted, and the processor is further configured to decrypt the at least some of the other information using a private key.

13. The video game system of claim 12, wherein the at least some of the other information in the responsive information includes information of characteristics of a game character in the videogame.

14. The videogame system of claim 10 wherein the device stores a plurality of public keys and the determining of the public key for use in validating the digital signature includes selecting one of the plurality of public keys to use to validate the digital signature using at least some of the other information received from the toy.

15. The videogame system of claim of claim 10 wherein the other information received from the toy includes at least one of a portion of an identifier of the toy, a year of manufacture of the toy, a nominal year of manufacture of the toy, a protocol of the toy, manufactured data, serial number data.

16. The videogame system of claim 10 wherein a portion of the digital signature is stored in a particular block in each one of a set of sectors of a plurality of sectors of memory in the toy.

17. The videogame system of claim 10 wherein the digital signature is generated using one of asymmetrical and symmetrical cryptography.

* * * * *